(12) United States Patent
Pyle et al.

(10) Patent No.: US 7,249,023 B2
(45) Date of Patent: Jul. 24, 2007

(54) NAVIGATED MENUING FOR INDUSTRIAL HUMAN MACHINE INTERFACE VIA SPEECH RECOGNITION

(75) Inventors: Michael W. Pyle, Hermitage, TN (US); Michael Jason Thurmond, Murfreesboro, TN (US)

(73) Assignee: Square D Company, Palatine, IL (US)

( * ) Notice: Subject to any disclaimer, the term of this patent is extended or adjusted under 35 U.S.C. 154(b) by 888 days.

(21) Appl. No.: 10/386,232

(22) Filed: Mar. 11, 2003

(65) Prior Publication Data

US 2004/0181414 A1   Sep. 16, 2004

(51) Int. Cl.
*G10L 21/00* (2006.01)
*G10L 11/00* (2006.01)
*G01R 21/00* (2006.01)

(52) U.S. Cl. .................. 704/270; 704/275; 702/60
(58) Field of Classification Search ............... None
See application file for complete search history.

(56) References Cited

U.S. PATENT DOCUMENTS

| | | | | |
|---|---|---|---|---|
| 5,199,077 A | * | 3/1993 | Wilcox et al. | 704/256 |
| 5,572,438 A | * | 11/1996 | Ehlers et al. | 700/295 |
| 5,659,665 A | * | 8/1997 | Whelpley, Jr. | 704/275 |
| 5,890,122 A | | 3/1999 | Van Kleeck et al. | |
| 6,384,591 B1 | * | 5/2002 | Estep et al. | 324/111 |
| 6,731,724 B2 | * | 5/2004 | Wesemann et al. | 379/88.16 |
| 6,847,300 B2 | * | 1/2005 | Yee et al. | 340/584 |
| 7,027,991 B2 | * | 4/2006 | Alexander et al. | 704/275 |
| 7,039,590 B2 | * | 5/2006 | Luchaup | 704/275 |

2002/0128837 A1   9/2002   Morin ................ 704/255

FOREIGN PATENT DOCUMENTS

EP   1 265 227   12/2002

OTHER PUBLICATIONS

Article "Intelligent Meters For Improved System Operation and Customer Relationship Management"; Proceedings of International Conference on Power System Technology (POWERCON) vol. 3, Oct. 13, 2002 (pp. 1758-1762).
European Search Report for European Application No. EP 04 00 5869, dated Jun. 15, 2004 (3 pages).
PCT International Search Report for International Application No. PCT/US2004/007350, dated Oct. 1, 2004 (5 pages).

* cited by examiner

*Primary Examiner*—David Hudspeth
*Assistant Examiner*—Brian Albertalli

(57) ABSTRACT

An industrial human-machine interface device that permits speech-controlled navigation through a menu using a speech-recognition processor. The speech-recognition processor is coupled to a microcontroller and a display. The microcontroller is interfaced with a power metering device which monitors a power signal in a circuit. To obtain a reading of a characteristic of the power signal, the operator speaks a spoken keyword into a microphone of the human-machine interface device. The speech-recognition processor converts the keyword into an identification word which is outputted by the processor to the microcontroller. The microcontroller polls the output of the processor, and upon detection of an identification word, executes a function associated therewith. Menu navigation among consecutive or nonconsecutive menu levels is performed by speaking one or more predetermined keywords. The speech-recognition processor can recognize the keywords independent of the speaker or may be trained for speaker-dependent recognition.

21 Claims, 2 Drawing Sheets

NAVIGATED MENUING FOR INDUSTRIAL HUMAN MACHINE INTERFACE VIA SPEECH RECOGNITION

FIELD OF THE INVENTION

This invention is directed generally to industrial human-machine interface devices and, more particularly, to a speech-controlled industrial human-machine interface device interfaced with power monitoring or industrial control equipment.

BACKGROUND OF THE INVENTION

Human-machine interface ("HMI") devices are typically used in industrial settings to configure setup parameters of industrial equipment and to display data provided from the industrial equipment. One such industrial equipment is power-metering equipment which monitors power signals in an electrical circuit. To obtain data and to configure setup parameters, an HMI device is attached to the power-metering equipment or is remotely tethered to it via an umbilical cable carrying communication and optional power signals between the HMI device and the power-metering equipment. The HMI device typically runs a menu-driven software program with which the operator interacts to configure setup parameters or to display data about the power signals monitored by the power-metering equipment. To navigate through the menu, the operator must push a button or a key on the HMI device or touch designated areas on a touch-screen overlaying the display of the HMI device. This manner of interacting with the HMI device is time-consuming and often confusing to the operator who may easily lose the way through a complex menu tree.

For example, if an operator is buried deep within a particular menu and wants to access a different menu, the operator must typically press one or more keys multiple times to navigate to the desired menu screen. Furthermore, the presence of a keypad or buttons on the HMI device poses a limitation on how small the HMI device can be built. Eliminating or reducing the keypad or buttons on the HMI device would allow its form factor to be reduced or would allow a larger display to be installed without increasing bulk.

One way to eliminate the need to navigate through a menu by pressing buttons or keys is to permit such navigation by speech recognition. The operator would simply speak a keyword which would be analyzed and converted by software into a digital information understandable to the microprocessor. The disadvantage to this approach is that voice-recognition software is expensive and requires a fast microprocessor to process spoken sounds without a significant delay.

What is needed, therefore, is an HMI device which overcomes these and other disadvantages. The present invention is directed to satisfying this and other needs.

SUMMARY OF THE INVENTION

Briefly, in accordance with the foregoing, an industrial HMI device generally includes a speech-recognition processor, a microcontroller, a display, and system memory. The speech-recognition processor converts a speech pattern spoken by an operator into an identification word which is provided to the microcontroller. Instructions stored in the system memory include functions which are associated with particular predetermined spoken keywords. When an identification word is received by the microcontroller, the function associated with that identification word is executed by the microcontroller. The microcontroller controls the display, and causes it to be altered in response to the recognition by the speech-recognition processor of one or more predetermined spoken keywords.

In an embodiment, the HMI device includes an interface operatively coupled between the microcontroller and an external industrial device, such as a power metering device. The instructions stored in the system memory cause a predetermined characteristic of a power signal associated with the external industrial device to be digitally provided to the microcontroller via the interface. The predetermined characteristics include power, voltage, current, energy, and total harmonic distortion. The external device may include one or more sensors to detect the predetermined characteristic and to produce a sensor signal corresponding to that characteristic. This sensor signal is converted to a digital value and provided to the microcontroller via the interface.

In another embodiment, the predetermined spoken keywords include custom spoken keywords which are stored in a memory connected to the speech-recognition processor. The predetermined spoken keywords are speaker independent, speaker dependent, or a combination of both. The HMI device also supports word spotting, in which a sequence of predetermined spoken keywords are recognized and converted into a corresponding identification word.

In yet another embodiment, the HMI device includes a keypad which is coupled to the microcontroller to facilitate manual entry of information. Menu navigation may occur through speech recognition only or through a combination of speech recognition and keypad entry.

The present invention also contemplates a method of providing speech-controlled navigation in an industrial HMI device. The method generally includes coupling a microcontroller to a speech-recognition processor and a display. A speech pattern representing one or more predetermined spoken keywords is converted by the speech-recognition processor into an identification word. Each identification word is associated with a function to be executed by the microcontroller when the identification word is provided to it from the speech-recognition processor. The function is executed causing the display, under control by the microcontroller, to display a predetermined characteristic of a power signal from an external device that is interfaced with the HMI device. In an embodiment, the external device is a power metering device.

According to another method embodiment of speech-controlled navigation through a multilevel menu in an industrial HMI device, a set of predetermined spoken keywords are organized into a multilevel menu. Each of the predetermined spoken keywords are associated with a corresponding identification word and with a function. A speech pattern representing a predetermined spoken keyword is converted, in a speech-recognition processor, into a corresponding identification word. The function associated with the identification word is executed by the microcontroller.

In another embodiment, the method calls for navigating from one level to a nonconsecutive level in the multilevel menu. In still another embodiment, an audible or visual confirmation is provided to indicate that the speech pattern was converted by the speech-recognition processor into an identification word.

The above summary of the present invention is not intended to represent each embodiment, or every aspect, of the present invention. This is the purpose of the figures and the detailed description which follow.

BRIEF DESCRIPTION OF THE DRAWINGS

The foregoing and other advantages of the invention will become apparent upon reading the following detailed description and upon reference to the drawings.

Figure 1:
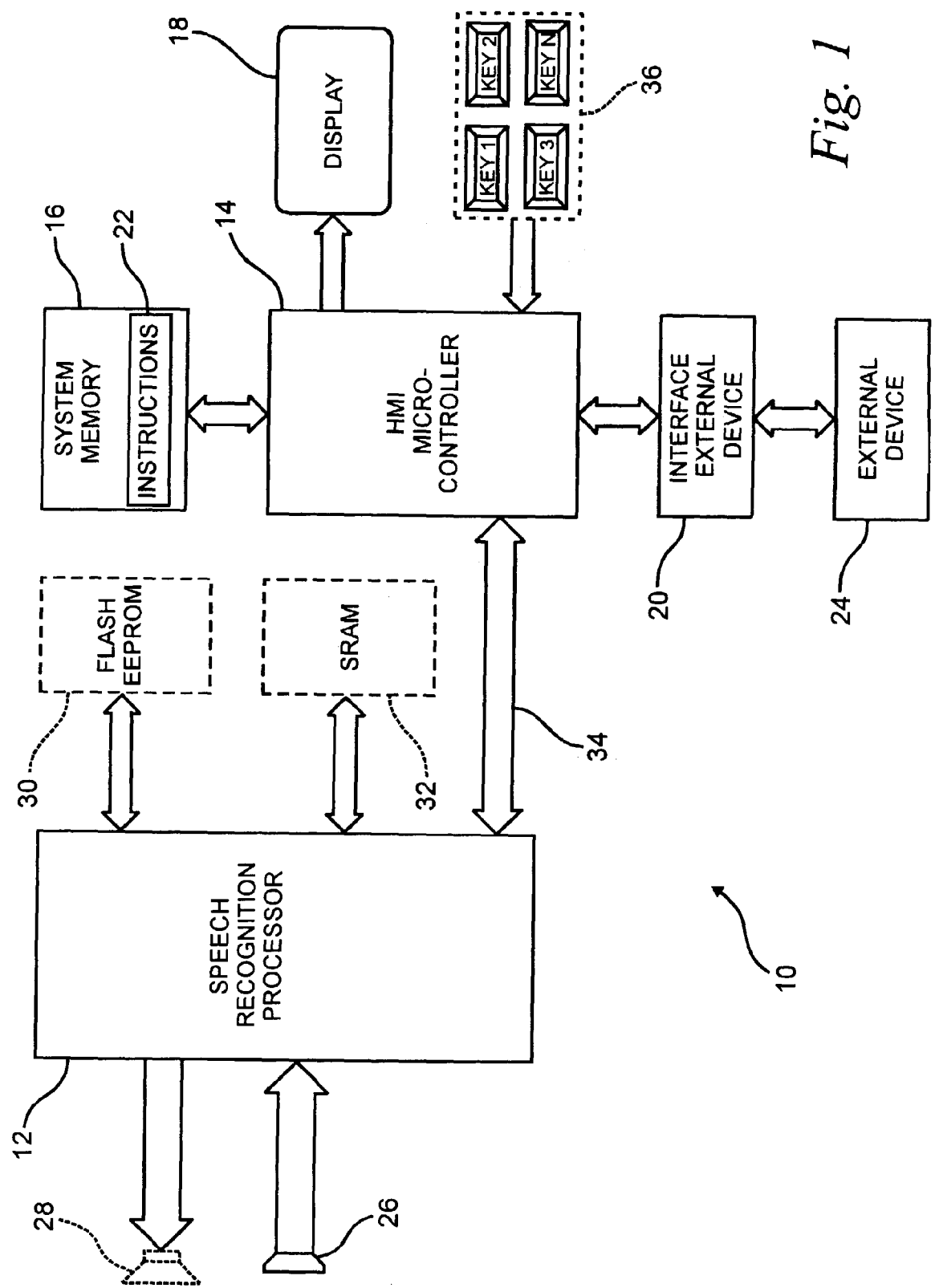
FIG. 1 is a functional block diagram of an HMI device according to one embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE ILLUSTRATED EMBODIMENT

Referring now to the drawings, and initially to FIG. 1, an industrial HMI device 10 generally includes a speech-recognition processor 12, a microcontroller 14, system memory 16, a display 18, and an interface 20 operatively coupled together using conventionally known techniques. The speech-recognition processor 12 is a processor which is capable of accurate speech recognition. An acceptable recognition accuracy is 90%, though an accuracy of 99% or better is preferred. An accuracy of less than 90% is contemplated by the present invention, and may be appropriate for some applications which have a limited set of voice commands or whose voice commands are easily distinguishable from other voice commands and therefore are likely to be recognized accurately. The speech-recognition processor can recognize individual predetermined keywords one at a time or may perform word spotting on a speech pattern to recognize a sequence of predetermined spoken keywords.

In a specific embodiment, the speech-recognition processor 12 is an RSC-4x speech-recognition processor commercially available from Sensory, Inc. The recognition and synthesis technology is provided in the Sensory Speech™ 7 firmware, which is also commercially available from Sensory, Inc. Application-specific software code may be generated using the RSC-4x Development Kit available from the same manufacturer. The speech-recognition processor 12 processes speech patterns, leaving the microcontroller 14 free to perform other tasks. In a specific embodiment, the microcontroller 14 is a 68 k-based microcontroller available from Motorola, Inc, though any other suitable microcontroller may be used.

The system memory 16 stores instructions 22, which are executed by the microcontroller 14. The instructions 22 generally facilitate interaction by the operator between the HMI device 10 and an external device 24 coupled to the HMI device 10 by interpreting speech patterns and displaying information based on those speech patterns on the display 18.

A microphone 26 is coupled to an input of the speech-recognition processor 12, which preferably includes circuitry for amplifying and converting audio signals received by the microphone 26 into corresponding digital audio signals. An optional speaker 28 is coupled to an output of the speech-recognition processor 12. The speaker 28 may be used to provide audible feedback to the operator that a speech pattern has been recognized by the speech recognition-processor 12, or to provide other audible information to the operator.

An optional Flash EEPROM 30 and an optional SRAM 32 may be coupled to the speech-recognition processor 12. The EEPROM 30 and the SRAM 32 optionally store speaker-dependent speech-recognition information and a set of custom keywords for expanding the speaker-independent vocabulary of the speech-recognition processor 12. The size of the EEPROM 30 and SRAM 32 depends at least on the number of keywords a particular application requires. It is understood that any other suitable non-volatile memory structure besides an EEPROM or SRAM may be employed instead.

An interface bus 34 couples the speech-recognition processor 12 with the microcontroller 14. When the speech-recognition processor 12 recognizes a speech pattern spoken into the microphone 26, it outputs on the interface bus 34 an identification word corresponding to the recognized speech pattern. The instructions 22 of the microcontroller 14 are programmed to set up a state machine which polls the outputs of the speech-recognition processor 12 as inputs. When an identification word is detected on the interface bus 34, the instructions 22 cause the microcontroller 14 to execute a function corresponding to the identification word. The use of a state machine expands the number of functions which can be associated with identification words. For example, if the interface bus 34 contains 6 data bits, the maximum number of distinct identification words which can be communicated across the bus 34 is 64 words. However, with a state machine, an identification word in state 0 may be distinguished from an identification word in state 1, which may be distinguished from the same identification word in state 2, and so forth. In this manner, the same identification word may be associated with different functions depending on the state in which that identification word is detected.

Thus, more than 64 words, in the case of a 6-bit wide bus 34, may be used in a particular application. For example, two different speech patterns may be associated with the same identification word, but cause different functions to be executed depending on the state in which each speech pattern is detected.

An optional keypad 36 may be coupled to the microcontroller 14 for providing an additional way of inputting data into the HMI device 10. Alternatively or additionally, the display 18 may include a touchscreen as a way of inputting data.

The microcontroller 14 generally controls what is displayed on the display 18, polls as inputs the outputs of the speech-recognition processor 12 via the bus 34 for an identification word, executes the function associated with an identification word, controls the I/O communications between the interface 20 and the external device 24, and processes input information from other input devices such as the optional keypad 36 and the optional touchscreen on the display 18. The instructions 22 stored in system memory 16 are conventionally programmed to provide these functionalities to the microcontroller 14.

In a preferred embodiment, the external device 24 is a power metering device, such as any PowerLogic® power metering device available from Square D Company. However, in other embodiments, the external device 24 may be any industrial device that uses an HMI device to display data or setup configuration information relating to an industrial application.

The external device 24 is operatively coupled to the microcontroller 14 by a cable using any conventional communications protocol, such as RS-232 or Ethernet. Alternately, the external device 24 may be connected to an internal connector (not shown) in the HMI device 10.

The speech-recognition processor 12 facilitates hands-free navigation by an operator through a menu by converting a predetermined keyword or sequence of predetermined keywords spoken by the operator into a menu function. An example of a multilevel menu containing a set of organized predetermined keywords for an HMI device connected to a power metering device is shown in the following Table I.

TABLE I

| Menu Level 1 | Menu Level 2 | Menu Level 3 | Menu Level 4 | Menu Level 5 |
|---|---|---|---|---|
| | Back | Display<br>Back | Display<br>Back | Display<br>Back |
| Device 1 | Display | | | |
| | | 3 Phase Summary | | |
| | | Current | | |
| | | | Demand<br>Min<br>Max<br>Peak Demand | |
| | | | | Phase A<br>Date/Time<br>Phase B<br>Data/Time<br>Phase C<br>Date/Time |
| | | Voltage | | |
| | | | Line to Line | |
| | | | | Min<br>Max |
| | | | Line to Neutral | |
| | | | | Min<br>Max |
| | | Power | | |
| | | | Real Time<br>Demand<br>Min<br>Max | |
| | | Energy | | |
| | | | Real | |
| | | | Reactive | |
| | | | Apparent | |
| | | Power Factor | | |
| | | | Displacement | |
| | | Frequency | | |
| | | THD | | |
| | | | Voltage | |
| | | | | Line to Line<br>Line to Neutral |
| | | | Current | |
| | | Setup | | |
| | | | Meter<br>Communications | |

TABLE I-continued

| Menu Level 1 | Menu Level 2 | Menu Level 3 | Menu Level 4 | Menu Level 5 |
|---|---|---|---|---|
| | Custom | | | |
| | Diagnostics | | | |
| | | Verify | | |
| | | | | Writing UnitHealth |
| | | Registers | | |
| | | | | Read Write |
| | | Versioninfo | | |

The operator can speak any keyword from Menu Level 1, and once the keyword is recognized by the speech-recognition processor 12, the operator can speak any of the keywords from Menu Level 2 to continue navigation through the menu. Once a keyword from Level 2 has been recognized, the keywords from Level 3 would be available, and so forth. The microcontroller 14 can also be programmed by the instructions 22 to allow the operator to navigate from one menu level to another nonconsecutive menu level. For example, if an operator monitoring Device 1 in the menu shown in Table I had just spoken "Display Current Min," the operator could navigate to the menu for displaying power characteristics by saying "Display Power Max." In this manner, the operator can jump from the (electrical) current menu to the power menu without having to say "Back" to navigate to the main menu.

Each of the Menu Levels can be associated with a state of a conventional state machine, making only certain choices available to the operator as particular selections are made. Thus, when the operator speaks the keyword "Display" and then "Voltage," and these keywords are recognized successfully by the speech-recognition processor 12, only the menu choices "Display, "Back," "Line to Line," and "Line to Neutral" are available to the operator. If after speaking "Display Voltage," the operator were to say "Displacement," the command would be ignored or an error message would be generated. Note that some keywords are valid commands in multiple menu levels. For example, "Voltage" is a keyword in both Menu Level 3 and Menu Level 4. When the operator says the keyword "Voltage" in either menu level, the same identification word is generated. A different function, however, is executed depending on the state in which the keyword is recognized (in the state representing Menu Level 3 or the state representing Menu Level 4).

Visual cues displayed on the display 18 can help orient the operator through the menu. For example, after "Display Power" is spoken by the operator and recognized by the speech-recognition processor 12, the operator may be shown on the display 18 that the next available menu choices are "Real Time," "Demand," "Min," and "Max." The display 18 is preferably of the LCD type, having a 4-line by 20-character resolution, though different types and sizes of displays may be used in other embodiments without departing from the scope of the present invention. If a larger display is desired, a 10.4 inch VGA LCD display or the like can be used, and may be backlit if desired.

As noted above, the present invention supports both speaker-independent keywords and speaker-dependent keywords. The keywords can be standard keywords, such as "display," "back," and "setup," or they can be custom keywords, such as "Unithealth" and "Versioninfo," which are stored off-chip from the speech-recognition processor 12. In speaker-independent mode, the operator would not have to train the HMI device 10. In speaker-dependent mode, the operator may train certain keywords to a specific speech length and pattern. The speaker-dependent training increases recognition accuracy and reduces or eliminates errors in menu navigation.

Some of the predetermined keywords shown in Table I generally correspond to data and setup configuration parameters. The data parameters include predetermined characteristics of a power signal provided from the external device 24 via the interface 20 to the HMI device 10. The predetermined characteristics of a power signal include current, voltage, power, energy, power factor, frequency, and total harmonic distortion (THD). When one of these menu functions are selected, the external device 24 monitors the desired characteristic from one or more of its various sensors on the power line(s) that it is monitoring, produces a sensor signal corresponding to the characteristic, and communicates the sensor signal via the interface 20 to the microcontroller 14. For example, if the operator wants the power demand on the power line which is being monitored by the external device 24, the operator would say "Display Power Demand." If these keywords are recognized by the speech-recognition processor 12, the associated function is executed by the microcontroller 14. The microcontroller 14 then instructs the external device 24 to evaluate the power demand on the power line and report back the result. The external device conventionally reads the power demand via a sensor coupled to the power line, converts the reading from an analog signal to a digital number, and transmits the digital number representing the power demand to the microcontroller 14 which displays the result on the display 18.

The setup configuration parameters allow the operator to adjust or calibrate meter settings or communications parameters between the HMI device 10 and the external device 24. The operator can also run diagnostics to verify wiring integrity or the health of the external device 24, to read from or write to selected registers for testing or verification purposes, or to obtain information about the software stored in the system memory 16.

The present invention contemplates speech-controlled menu navigation as well as a combination of speech-controlled menu navigation and manual menu navigation using the keypad 36 or other input device. The keypad 36 may also be used for data entry in, for example, the setup configuration menu.

Figure 2:
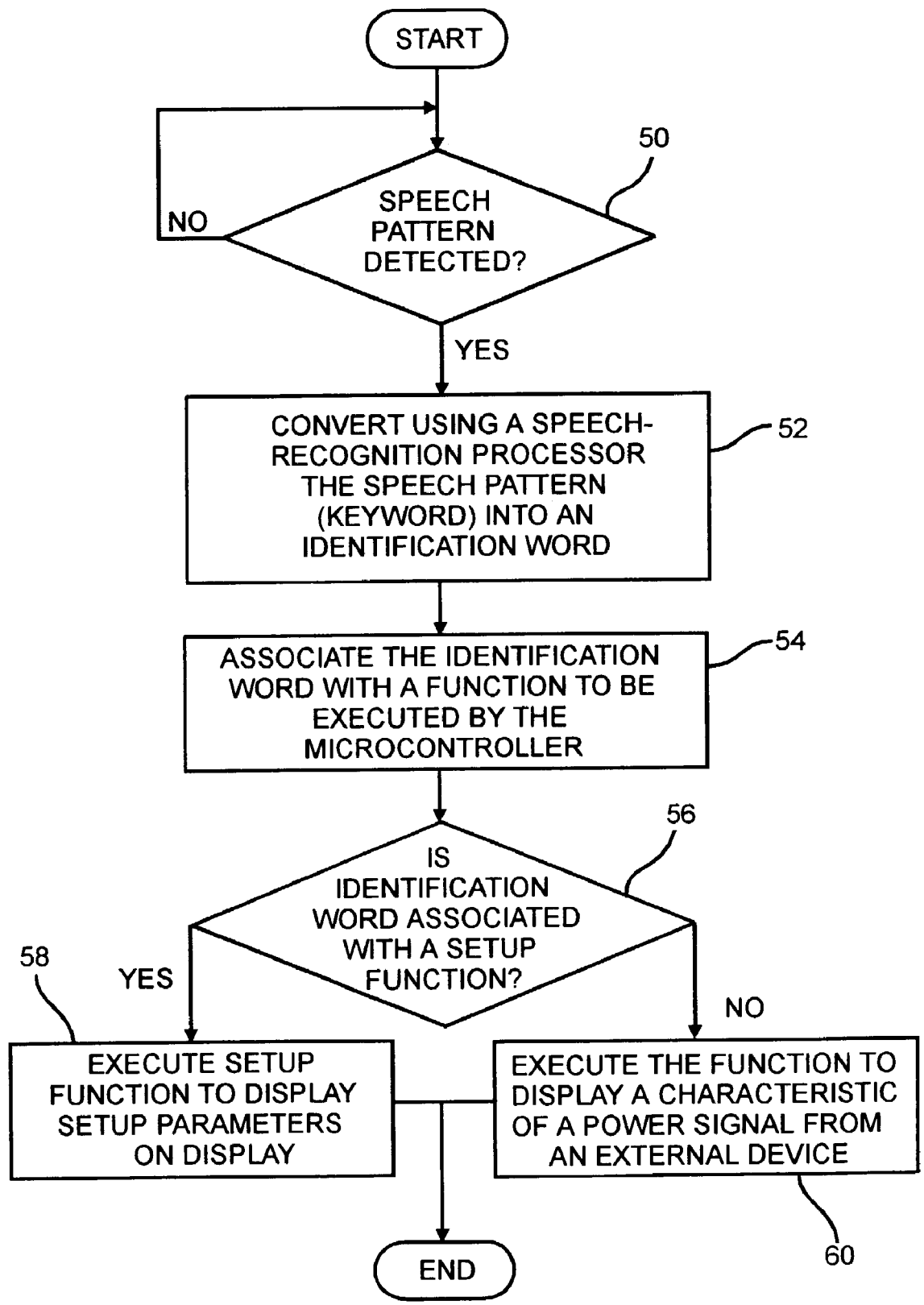
FIG. 2 is a flow chart diagram of speech-controlled navigation in an HMI device according to one embodiment of the present invention.

FIG. 2 is a flowchart generally illustrating the steps for speech-controlled navigation through a menu in an HMI device such as the HMI device 10 shown in FIG. 1. According to the present invention, speech patterns are converted into corresponding identification words by a speech-recognition processor. At step 50, the speech-recognition processor polls until a speech pattern is detected. If a speech pattern is detected and recognized, at step 52, the speech pattern corresponding to a predetermined keyword is converted by the speech-recognition processor into an identification word as described above. It should be emphasized that this conversion is accomplished through hardware in the speech-recognition processor. The conversion is speaker independent but for higher accuracy may be speaker dependent. In another embodiment, step 52 performs word spotting, which involves recognizing a sequence of predetermined spoken keywords, rather than an individual keyword. Referring to Table I, an example of a sequence of predetermined spoken keywords is "Line to Neutral."

The identification word is associated with a function to be executed by the microcontroller at step 54. Note that the steps described in connection with FIG. 2 need not be performed in the order presented and may be performed concurrently with other steps. At step 56, the software determines whether the identification word corresponding to the spoken keyword is associated with a function corresponding to a setup function, such as one described under the "Setup" branch of the menu tree shown in Table I. For ease of discussion, step 56 indicates a binary choice between a setup function or a non-setup function, but it is understood that the functions associated with identification words can be arranged into more than two categories. In Table I, for example, there are "Custom" and "Diagnostics" functions in addition to a "Setup" function and functions for monitoring power characteristics of a power signal.

If the identification word outputted by the speech-recognition processor is associated by the microcontroller with a setup function, the microcontroller executes that setup function to display a setup parameter on the display at step 58. The setup parameter may be a communications setting, for example, such as a baud rate.

Otherwise the microcontroller executes the function to display on the display a predetermined characteristic of a power signal from the external device at step 60. For example, if the function to be executed is "Display Voltage Line-to-Line Max," the microcontroller requests the external device to send back the maximum line-to-line voltage on a power line. The microcontroller then displays the result in a manner meaningful to the operator. As mentioned above, the microcontroller may need to determine whether other types of functions need to be executed.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. An industrial human-machine interface device, comprising:
   an integrated circuit including a speech-recognition processor operable to convert a speech pattern to an identification word representing said speech pattern;
   a microcontroller operatively coupled via an interface bus to said speech-recognition processor to receive said identification word from said speech-recognition processor;
   a display operatively coupled to said microcontroller;
   an interface operatively coupled between said microcontroller and a power metering device that monitors at least one predetermined characteristic of a power signal; and
   a first memory storing instructions, said first memory being coupled to said microcontroller, said instructions when executed by said microcontroller causing said display to be altered in response to one or more predetermined spoken keywords recognized by said speech-recognition processor, said predetermined spoken keywords including power-related keywords each corresponding to different predetermined characteristics of said power signal, said predetermined characteristics including at least one of power, voltage, current, energy, frequency, or total harmonic distortion, said instructions further causing said at least one predetermined characteristic to be provided to said microcontroller via said interface.

2. The industrial human-machine interface device of claim 1, wherein said power metering device is external to said industrial human-machine interface device.

3. The industrial human-machine interface device of claim 2, wherein said predetermined characteristic of said power signal includes one of power, voltage, current, energy, frequency, and total harmonic distortion.

4. The industrial human-machine interface device of claim 1, said power metering device including at least one sensor adapted to detect said predetermined characteristic of said power signal and to produce a sensor signal corresponding to said predetermined characteristic of said power signal.

5. The industrial human-machine interface device of claim 1, wherein said predetermined spoken keyword is a custom spoken keyword for a particular application.

6. The industrial human-machine interface device of claim 1, further comprising a second memory coupled to said speech-recognition processor, said second memory storing information indicative of custom spoken keywords.

7. The industrial human-machine interface device of claim 1, wherein said predetermined spoken keywords are generally speaker-independent.

8. The industrial human-machine interface device of claim 1, further comprising a keypad operatively coupled to said microcontroller.

9. The industrial human-machine interface device of claim 1, wherein said industrial human-machine interface device is incorporated in said power metering device.

10. The industrial human-machine interface device of claim 1, further comprising a microphone operatively coupled to said speech-recognition processor to convert audio signals into digital signals corresponding to said speech pattern.

11. A method of providing speech-controlled navigation in an industrial human-machine interface component, comprising:
    coupling a microcontroller to an integrated circuit that includes a speech-recognition processor via an interface bus and a display;
    converting, via said speech-recognition processor, a speech pattern representing one or more predetermined spoken keywords into an identification word;
    associating said identification word with a function to be executed by said microcontroller;
    providing said identification word from said speech-recognition processor to said microcontroller; and
    responsive to said providing, executing said function to display, on said display, a predetermined characteristic of a power signal provided from a power metering device interfaced with said industrial human-machine interface component, said predetermined spoken keywords including power-related keywords each corresponding to different predetermined characteristics of said power signal, said predetermined characteristics including at least one of power, voltage, current, energy, frequency, or total harmonic distortion.

12. The method of claim 11, wherein said converting is generally speaker-independent.

13. The method of claim 11, further comprising training said speech-recognition processor to recognize a custom spoken keyword.

14. The method of claim 11, further comprising word spotting said speech pattern to recognize a sequence of more than one predetermined spoken keywords.

15. The method of claim 11, wherein said predetermined characteristic of a power signal includes one of power, voltage, current, energy, frequency, and total harmonic distortion.

16. The method of claim 11, wherein said power metering device is external to said human machine-interface component.

17. A method of speech-controlled navigation through a multilevel menu in an industrial human-machine interface component, comprising:
    organizing a set of predetermined spoken keywords into a multilevel menu, wherein different subsets of said keywords are available in different levels of said menu and wherein at least some of said keywords correspond to different predetermined characteristics of a power signal, said predetermined characteristics including at least one of power, voltage, current, energy, frequency, or total harmonic distortion;
    associating each of said predetermined spoken keywords with a corresponding identification word and with an associated menu function, wherein at least one of said keywords in a menu level corresponds to a menu function that makes available a different subset of keywords in a different menu level;
    converting, in an integrated circuit that includes a speech-recognition processor, a speech pattern representing a predetermined spoken keyword into a corresponding identification word;
    executing, in a microcontroller operatively coupled to said integrated circuit via an interface bus, the menu function associated with said identification; and
    interfacing said industrial human-machine interface component with a power metering device that monitors at least one predetermined characteristic of said power signal.

18. The method of claim 17, further comprising navigating from one level to a nonconsecutive level in said multilevel menu.

19. The method of claim 17, displaying said at least one predetermined characteristic of said power signal provided from said power metering device.

20. The method of claim 17, further comprising providing one of an audible and visual confirmation that said speech pattern was converted by said speech-recognition processor into an identification word.

21. The method of claim 17, wherein said industrial human-machine interface component is external to said power metering device.

* * * * *